United States Patent [19]
Lurie et al.

[11] Patent Number: 5,481,243
[45] Date of Patent: Jan. 2, 1996

[54] BRAKING SYSTEM HAVING VARIABLE INTENSITY LIGHT AND SOUND WARNING

[76] Inventors: Ranan R. Lurie, 9 Mountain Laurel Dr., Greenwich, Conn. 06831; Daniel Putnam, Steuben Rd., Box 212, Peekskill, N.Y. 10566; Isac Tabib, 16 Carthage La., Scarsdale, N.Y. 10583

[21] Appl. No.: 280,712

[22] Filed: Jul. 26, 1994

Related U.S. Application Data

[63] Continuation of Ser. No. 972,008, Nov. 5, 1992, abandoned.

[51] Int. Cl.$^6$ ..................................................... B60Q 1/50
[52] U.S. Cl. ........................................... 340/467; 340/479
[58] Field of Search ...................................... 340/463, 464, 340/467, 479, 441; 307/10.8

[56] References Cited

U.S. PATENT DOCUMENTS

| | | | |
|---|---|---|---|
| 2,156,751 | 5/1939 | Collins | 340/467 |
| 2,474,610 | 6/1949 | Wunsch | 340/467 |
| 3,538,496 | 11/1970 | Bumpous | 340/467 |
| 3,576,528 | 4/1971 | Hendrickson | 340/467 |
| 3,601,794 | 8/1971 | Blomenkamp et al. | 340/467 |
| 3,748,643 | 7/1973 | Jacobs | 340/467 |
| 3,761,875 | 9/1973 | Camp | 340/467 |
| 4,357,594 | 11/1982 | Ehrlich et al. | 340/467 |
| 4,788,526 | 11/1988 | Eckstein et al. | 340/467 |
| 4,983,953 | 1/1991 | Page | 340/467 |
| 5,059,947 | 10/1991 | Chen | 340/467 |
| 5,089,805 | 2/1992 | Salsman | 340/467 |
| 5,121,100 | 6/1992 | Gallo | 340/467 |
| 5,148,147 | 9/1992 | Kobres | 340/467 |

*Primary Examiner*—Brent A. Swarthout
*Attorney, Agent, or Firm*—Ware, Fressola, Van Der Sluys & Adolphson

[57] ABSTRACT

A vehicle deceleration detection circuitry, upon which, a vehicle's rear brake lights will provide to a trailing vehicle, a continuous and variable intensity brake light as an indication of its braking pattern. In addition, in case of emergency braking, an additional light or strobe and an audible alert buzzer or horn will be turned on as to provide additional warning to a trailing vehicle. The vehicle deceleration detection circuit includes a microprocessor for providing continuous braking pattern indication, even if the vehicle is skidding on ice or oil; a condition which generates no G-force, which will not trip any mechanical detector.

3 Claims, 4 Drawing Sheets

BRAKING SYSTEM HAVING VARIABLE INTENSITY LIGHT AND SOUND WARNING

This is a continuation of application Ser. No. 07/972,008 filed on Nov. 5, 1992, now abandoned.

This invention relates to a braking system. More particularly, the invention relates to an automobile braking system for detecting deceleration and providing a combined audio and visual warning, for the ultimate and complete sight/sound rear braking warning to a tailing vehicle. The braking system is microprocessor-based and provides a continuous braking pattern indication.

BACKGROUND OF THE INVENTION

The existing braking warnings on the road today cannot deliver efficient warning at night, when a driver cannot assess the distance between their car and the braking car in front, and the driver cannot distinguish between a routine braking action and a sudden, total stop in the darkness (this applies, of course, also to daytime, poor visibility weather conditions.)

There are many known prior art braking devices which try to solve this problem, but approach the problem only partially. The known devices rely on mechanical deceleration detectors (i.e. inertia) that may provide brake light intensity change. All of these known devices try to aid a tailing driver in recognizing the braking rate of the vehicle in front: For example, Wuhsch (U.S. Pat. No. 2,474,610), Hendrickson (U.S. Pat. No. 3,576,528) and Jacobs (U.S. Pat. No. 3,748,643) show an automobile braking systems which change the brake light color—red, amber and green. Chen (U.S. Pat. No. 5,059,947) varies the intensity of the brake light depending on the speed of the vehicle. Salsman (U.S. Pat. No. 5,089,805) shows mechanical deceleration inertia switches which sequentially activate rows of lights depending on the rate of deceleration. Eckstein (U.S. Pat. No. 4,788,526) shows a braking system having accelerator pedal with a switch for activating the brake lights. Collins (U.S. Pat. No. 2,156,751) shows an automobile braking system having a brake pedal inertia switch for sounding a horn depending on the rate of depression of the brake pedal. None of the known braking systems provides both an audio and visual warning system to warn trailing vehicles in any weather condition and daytime or night time.

Recently, the Federal Government has required the addition of high, rear deck mounted brake lights to motor vehicles to improve safety by providing additional warning to trailing vehicles about the deceleration or braking of a motor vehicle to prevent or reduce the number of rear end collisions. This is an indication of how important additional warning devices are needed in the automobile industry.

BRIEF SUMMARY OF THE INVENTION

The invention provides a braking system for a vehicle, having vehicle velocity sensing means, for providing a vehicle velocity indication signal; deceleration detection means, responsive to the vehicle indication signal, for providing a vehicle deceleration rate signal; and deceleration warning means, responsive to the vehicle deceleration rate signal, for providing a variable deceleration warning depending on the rate of deceleration of the vehicle.

In one embodiment, the deceleration detection means includes a vehicle velocity differential circuit, responsive to successive vehicle velocity indication signals, for providing a differential vehicle velocity deceleration signal as the vehicle deceleration rate signal.

In another embodiment, the deceleration warning means includes a brake light display means, responsive to the differential vehicle deceleration rate signal, for providing a variable visual warning display depending on the rate of deceleration of the vehicle, and a horn means, including a rear mounted buzzer/horn means, responsive to the differential vehicle deceleration indication signal, for providing an audio warning depending on the rate of deceleration of the vehicle. The horn means preferably has a sound that is substantially different than the typical sound of a horn so approaching vehicles and pedestrians can distinguish between normal and extreme deceleration conditions.

In a preferred embodiment, the braking system for a vehicle has vehicle velocity sensing means, for providing a vehicle velocity indication signal; deceleration detection circuit means, responsive to the vehicle velocity indication signal, for providing a vehicle deceleration rate signal; visual display means, responsive to the vehicle deceleration rate signal, for providing a variable visual warning display depending on the rate of deceleration of the vehicle; and audio means, responsive to the vehicle deceleration rate signal, for providing an audio warning depending on the rate of deceleration of the vehicle.

In another preferred embodiment, the vehicle velocity sensing means includes a pulse generator having a spinning wheel positioned in a U-shaped photoelectric sensor (5) for providing a series of pulsed square waves.

In still another preferred embodiment, the deceleration detection circuit means includes a counter for counting the series of pulse square waves in a given interval of time, and for providing an n-bit count.

In still another preferred embodiment, the deceleration detection circuit means includes a pair of buffers for storing successive n-bit counts of pulse square waves.

In still another preferred embodiment, the deceleration detection circuit means includes an add/subtract means for providing a difference between the successive n-bit counts of pulse square waves.

In still another preferred embodiment, the deceleration detection circuit means includes a programmable read only memory (PROM) for storing the system program and tables for translating and analyzing the deceleration differences.

One object of the invention is to increase the deceleration warning to the trailing vehicle dramatically once a certain emergency threshold has been reached, by simultaneously warning with a visual warning and an audible horn warning directed exclusively towards the rear of the braking car. Together the dual audio and visual warning will intensify the warning to an unsuspecting, tailing car. The audible element will also serve to alert a tailing car's driver, for example, a driver who is inattentive behind the wheel, or a driver who has consumed too much alcoholic beverages, or a driver who is drowsy or tired after working all day.

Another object of the invention is that even if the vehicle is skidding on ice, oil or any slippery road surface then the braking system will still provide both the audio and visual warning signal (these conditions, which do not generate G-forces, will not trip any mechanical detector). Since the detector and processor do not use G-force detection, but rather wheel RPM detection, brake light intensity will vary when the vehicle encounters ice or oil as well. The known prior art is unable to detect these conditions. Further, the brake lights will function in the variable mode, even when the vehicle is driven in reverse. Further still, if a vehicle is out of control but the driver does not apply force on the pedal, a significant deceleration decrease will be detected and an audio and visual warning will be provided by the braking system.

The following are some of the unique advantages of the invention: The brake light intensity change is continuous, once the brake pedal has been depressed, not just 3–4 stepped lights, which will make it difficult for the trailing driver to follow. No mechanical sensor or mechanism is used. This will reduce service needs. Since the detector and processor do not use G-force detector, but rather the wheel's RPM, brake light's intensity will vary when the vehicle encounters ice or oil. The known prior art is not able to detect this condition. In addition, with this processor the brake lights will function in the variable mode, even when the vehicle is driven in reverse. The addition of strobe/light and buzzer/horn, once a certain braking threshold has been reached, will provide additional warning to the trailing vehicle.

THE DRAWINGS

For a fuller understanding of the nature and objects of the invention, reference should be made to the following detailed description taken in connection with the accompanying drawing, in which.

BEST MODE FOR CARRYING OUT THE INVENTION

Figure 1:
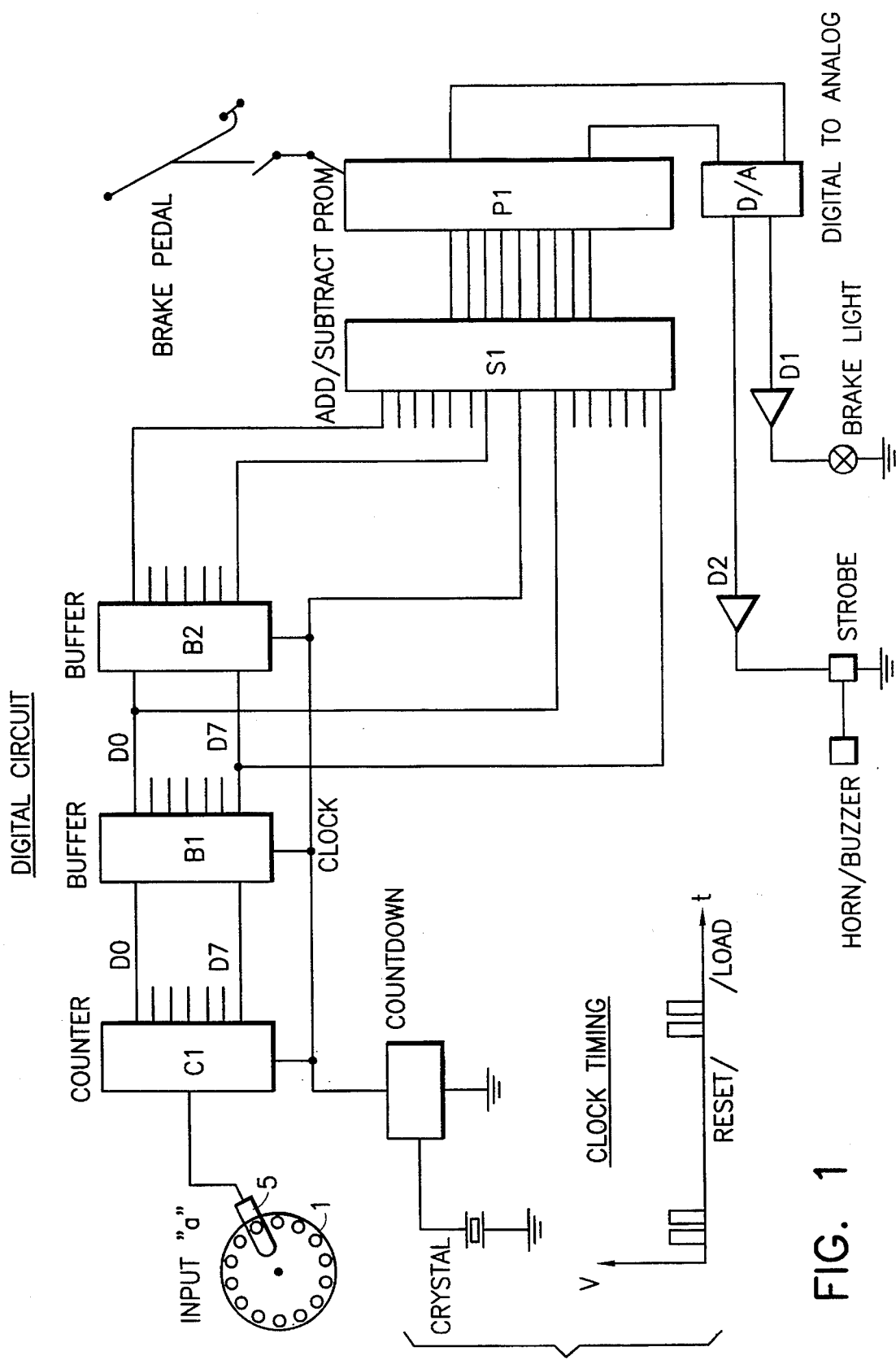
FIG. 1 shows a schematic diagram of the invention.

FIG. 1 shows the vehicle velocity sensing means having a spinning slotted disc (1), that is connected to a speedometer cable (10), and encapsulated within U-shaped photoelectric sensor (5). As the disc (1) spins, a pulsed square wave (15, 16) (see FIG. 3) is generated at predetermined number of pulses per second depending on the speed of the vehicle. Such a pulse generator is known in the an and described with respect to FIG. 2. The pulsed square wave (15, 16) is fed to a deceleration detection circuit via input "A" to counter C1. When a clock "load" pulse is encountered, the counter C1 data is shifted via data lines D0–D7 to buffer B1, and then the counter C1 is "reset" to "0". When the next "load" clock signal is detected, data in buffer B1 is transferred via data lines D0–D7 to buffer B2 and the new count is shifted to the "empty" buffer B1.

For example, initially, pulses are counted (n) during a specific clocked time span (t), then stored in buffer B1. This process is repeated, and a new count is produced. The old count in buffer B1 is shifted to buffer B2 and the new count is shifted into the "empty" buffer B1.

An add/subtractor circuit (S1) compares the counts in buffers B1 and B2. This difference is the product of the deceleration process and the greater the difference, the more severe the acceleration/deceleration. The add/subtractor circuit provides a velocity differential signal to a PROM (Programmable Read Only Memory), which stores the system program. The PROM Pt has instruction tables to translate pulse differences into deceleration rates. For example, a subtracted difference of 64 pulses, which in turn is the result of 25% deceleration may result in brake light intensity increasing by 25% as to indicate moderate deceleration. In addition, the PROM P1 uses a memory circuit to monitor the deceleration trend and maintain brake light intensity to compensate for the inevitable reduction in pulse count, as the vehicle slows down upon depressing the brake pedal. This will prevent momentary high intensity turn on in case of rapid deceleration, and rather maintain a smooth intensity variation as the vehicle is slowing down. The PROM P1 provides a velocity differential signal to the D/A (Digital to Analog) converter. The D/A converter converts the velocity differential signal into an analog signal for driving driver D1, which amplifies it enough to be able to light the brake bulbs. In case of emergency, driver D2 will be turned on as well, to provide sufficient power for the buzzer/horn and strobe/light. For example, a difference of 64 pulses means moderate braking pattern, which is equal to 125% of break light brightness. PROM P1 provides a signal to a D/A (Digital to Analog) converter, and depending on whether the brake pedal (17) has been depressed, the brake light will come on and vary in its intensity depending on the deceleration rate. If the deceleration rate exceeds a certain threshold, a strobe/light and buzzer/horn will come on as well, to indicate severe braking condition.

Figure 5:
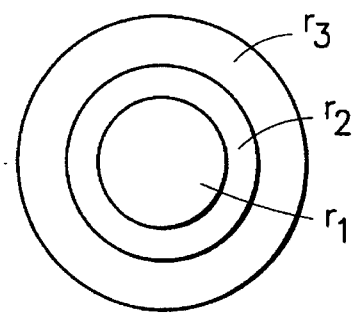
FIG. 5 shows a brake light arrangement.

In one embodiment, for visual warning, the vehicle's own rear tail lights can be used, for example the white, reverse light indicators. In one embodiment, a series of concentrically arranged tail lights may be used, as shown in FIG. 5, so that increasing deceleration rates are indicated by lighting an inner ring $r_1$ for light deceleration, the inner ring $r_1$ and a middle ring $r_2$ for medium deceleration, and the inner and middle rings $r_1$, $r_2$ and an outer ring $r_3$ for extreme deceleration. The invention is surely not limited to the particular geometric arrangements of the visual warning lights. Moreover, a special type of bulb will be used to provide normal visual intensity between a one voltage range, such as 8–9 volts, and a higher visual intensity in another voltage range, such as 12 volts.

For audio warning, a rear mounted Klaxon horn may be triggered when the rate of deceleration exceeds a predetermined threshold. In a preferred embodiment the sound of the audio warning should be substantially different than the typical sound of the vehicle horn so that approaching drivers and pedestrians can properly distinguish the two.

The Pulse Generator

Figure 2:
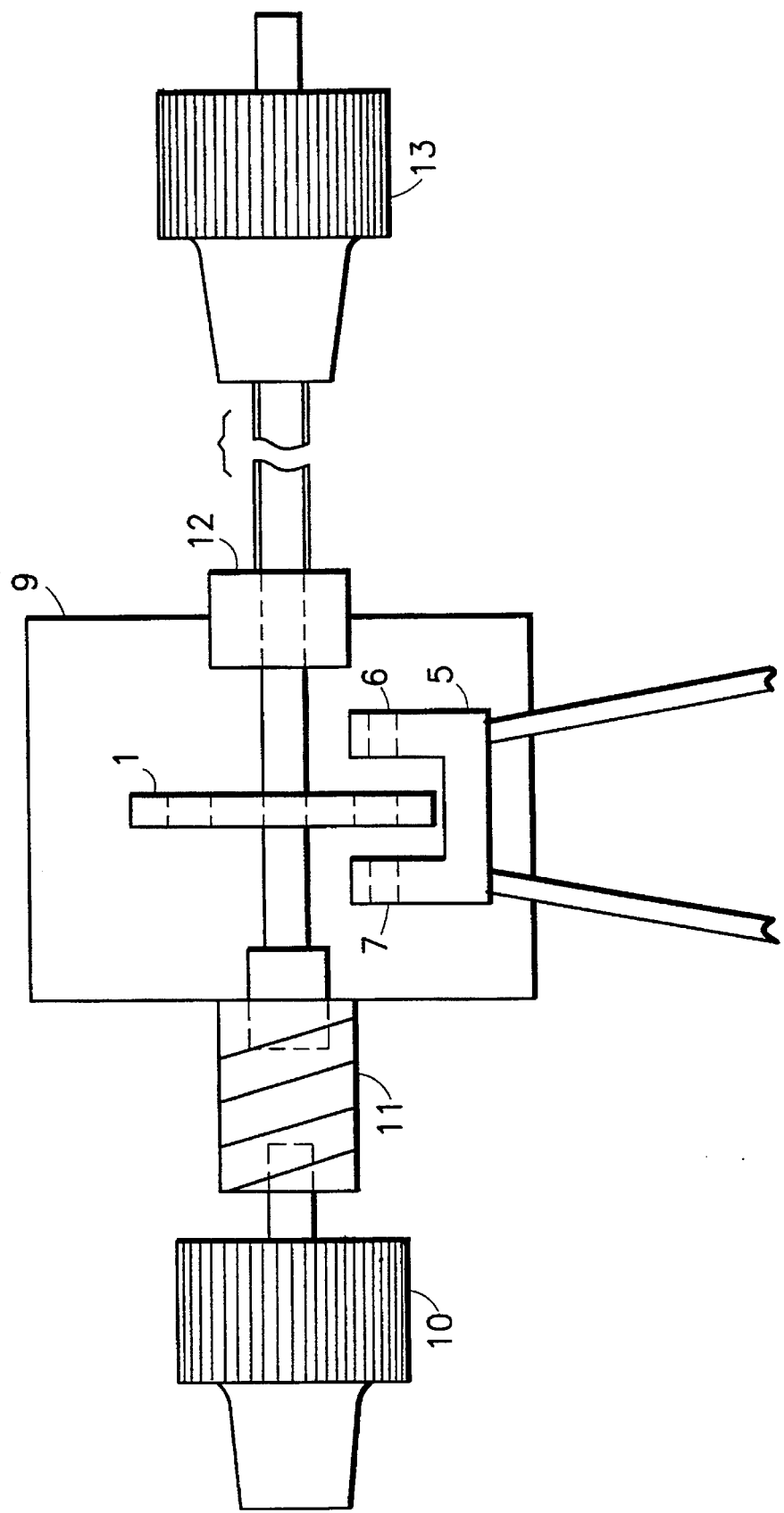
FIG. 2 shows a pulse generator.
Figure 3:
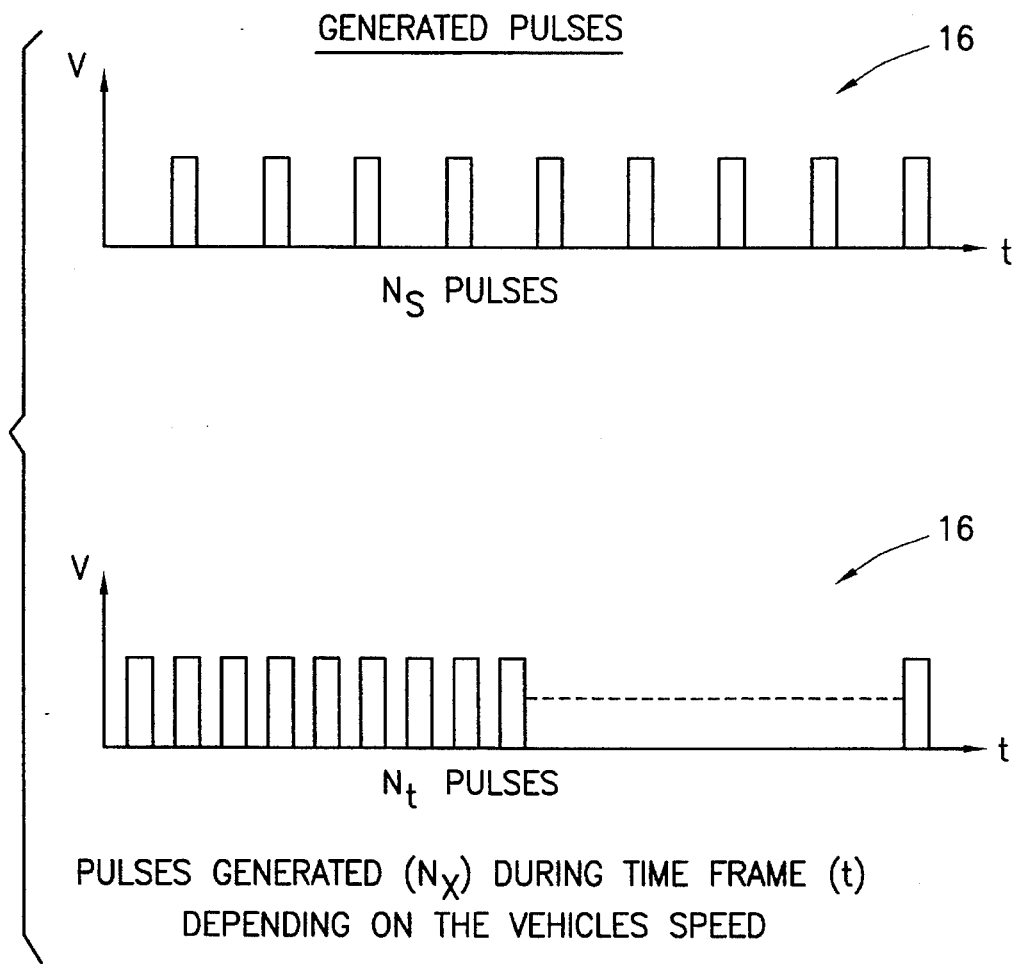
FIG. 3 shows a diagram of pulses generated by the pulse generator of FIG. 2.

FIG. 2 shows a pulse generator which is known in the art. Typically, the pulse generator provides digital square pulses which are used to calculate the vehicles traveling speed for vehicles having a digital display board. A sample of these pulses for each time interval will be fed to input "A" and follow the logic path described in "Block Diagram Description".

However, some vehicles use mechanical dashboards or provide an inadequate number of pulses per mile, and the invention may be retro-fitted therein as well. For example, the following item will be constructed to generated the square pulses as described. The speedometer cable (10) would be disconnected from the dash board assembly and connected to the mating connector (11) which is part of the pulse generator (9). In this generator (9), a slotted disc (1) is installed on firm axis (12). The same firm axis (12) is connected to short jumper speedometer cable (13), to be reconnected to the dash board assembly (not shown). This way, the speedometers speeding cable (10) is interrupted, sampled via the diso's spinning (1) holes and fed back to the speedometer (not shown), to continue indicating to the driver the vehicles traveling speed. The U-shaped photoelectric sensor (5) employs infra red light source (6) mounted opposite light receiver (7). As the slotted disc (1) spins, light is allowed to pass, then blocked and so on, to continuously form pulsed square wave, with variable count (per see) depending on the vehicles traveling speed.

The Flow Chart

Figure 4:
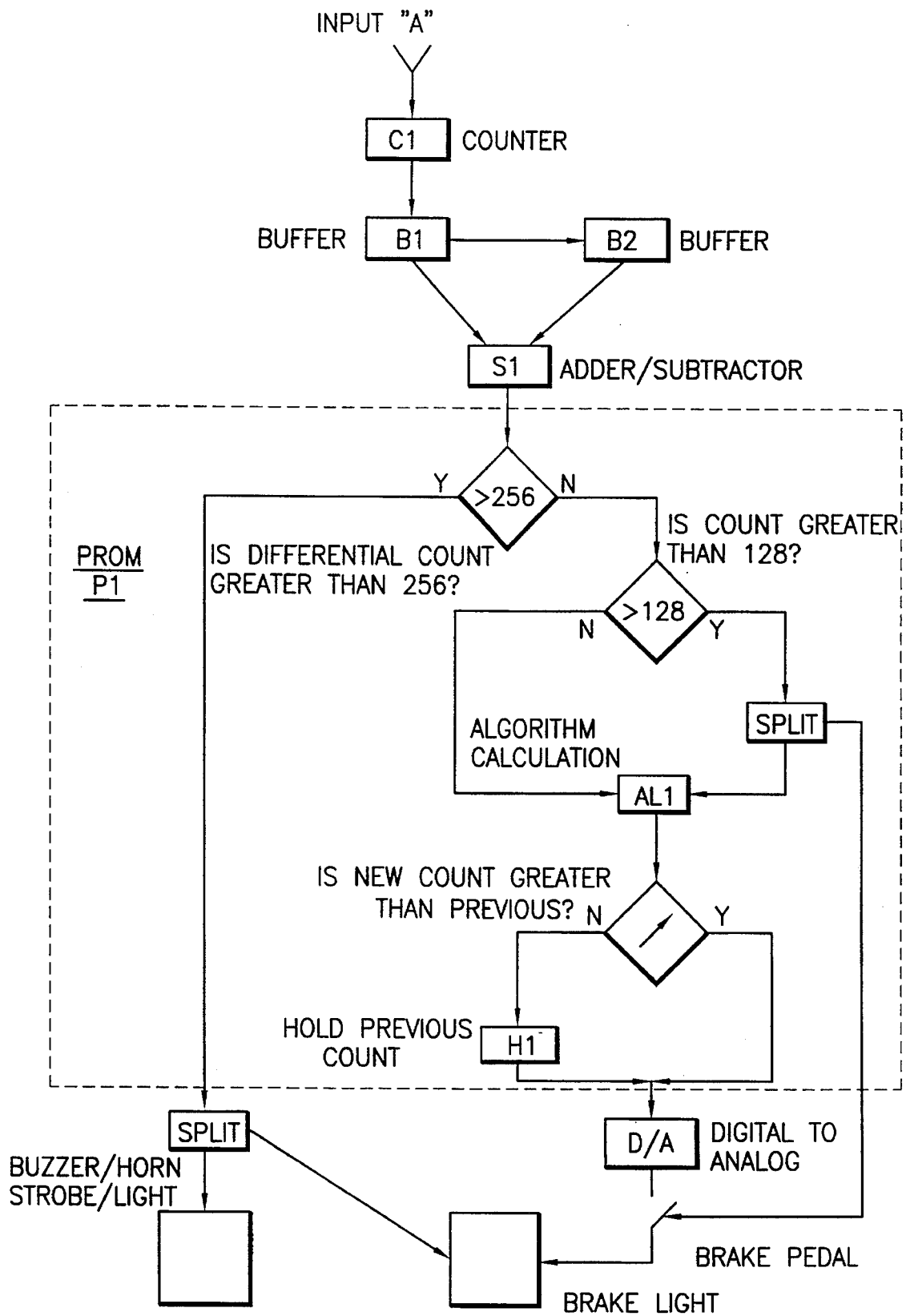
FIG. 4 shows a flow chart of the system program.

FIG. 4 shows a flowchart of the microprocessor program.

Square wave pulses will be input through input A to counter C1. After a time frame (t), the count from counter C1 is shifted to buffer B1 and counter C1 is then reset to zero. On the next load clock signal, the data from buffer B1 is transferred to buffer B2 and the new data in counter C1 is then entered to buffer B1. The contents of both buffer B1 and B2 are then fed to the adder/subtractor S1. The output of subtractor S1 is in the range of 1–256 showing extreme and severe braking pattern. This count is then fed to PROM P1.

The PROM P1 operates as follows: The input amount to PROM P1 from subtractor S1 is analyzed first to check whether the count amount is greater than 256 as to show an extreme and severe braking pattern. In case of 'yes', an output is generated to activate the buzzer/horn and the braking light even if the driver did not press the brake pedal to its fullest brightness. This is an important aspect of the invention, for example, because in cases where a vehicle may be crashed, and the driver is unconscious, the braking system senses a significant change in the vehicle velocity, and still provides both an audio and visual deceleration warning to approaching vehicles.

If the count is less than 256, it is fed to another circuit to check whether the count is greater or smaller than 128 pulses. If the count is greater than 128 pulses, then the processor senses a 50% deceleration rate, which is quite severe but yet not extreme, so it will automatically simulate a condition as if the brake pedal has been depressed, although the driver may or may not have done so, and in addition a sample of the count will be continually fed to a algorithm calculation module showing on the chart as AL1.

If the pulse count is less than 128 pulses, then the count will be fed directly to AL1. The output of AL1 is then fed to a logic circuit that will determine the trend of acceleration/deceleration, that is it will constantly store a "trend" data within it as to do the following: If the rate of pulses is increasing to show additional braking, the output mount will be transmitted to the D/A (Digital to Analog) converter.

If it has been determined that the pulse count is actually decreasing as to show that the vehicle is not slowing down further, the last count is being held in circuit H1 as to preserve the last intensity count which will be fed into the D/A circuit. The hold H1 circuit is designed so that in the process of braking, no condition will result whereby the brake lights will come on in the high intensity mode for a short period since it is inevitable to get a smaller count as the vehicle is slowing down. The output of the D/A is fed to driver D1 which only acts as an amplifier and then through the brake switch to the brake light bulbs.

It will thus be seen that the objects set forth above, and those made apparent from the preceding description, are efficiently attained and, since certain changes may be made in the above construction without departing from the spirit and scope of the invention, it is intended that all matters contained in the above description or shown in the accompanying drawing shall be interpreted as illustrative and not in a limiting manner.

It is also to be understood that the following claims are intended to cover all of the generic and specific features of the invention herein described, as a matter of language, might be said to fall therebetween.

What is claimed is:

1. A braking system for a vehicle for providing a combined audio and visual warning, comprising:

a pulse generator means having a spinning wheel positioned in a U-shaped photoelectric sensor, for providing a pulsed square wave signal indicative of the speed of the vehicle;

deceleration detection circuit means, having a vehicle velocity differential circuit comprising:

a counter means, for counting the pulsed square wave signal in a given interval of time, for providing an n-bit counter signal;

means for generating a load clock signal;

a first buffer means, responsive to the n-bit counter signal, for storing a first buffer counter signal upon encountering said load clock signal;

a second buffer means, for storing the first buffer counter signal from the first buffer means in the form of a second buffer counter signal upon encountering a subsequent load clock signal:

said first buffer means storing a new first buffer counter signal responsive to the n-bit counter signal upon encountering said subsequent load clock signal;

an add/subtract means, responsive to the new first buffer counter signal, and further responsive to the second buffer signal, for providing an add/subtract signal indicating the difference between the new first buffer counter signal and the second buffer counter signal indicative of differential vehicle velocity deceleration rate;

programmable read only memory means, responsive to the add/subtract signal, and further responsive to a depression of a brake pedal, for providing a digital audio indication signal, and for further providing a digital visual indication signal;

digital-to-analog converter means, responsive to the digital audio indication signal, for providing an analog audio indication signal, and further responsive to the digital visual indication signal, for providing an analog visual indication signal;

visual brake warning means, responsive to the analog visual indication signal, for providing a variable visual warning display depending on the rate of deceleration of the vehicle; and audio brake warning means, responsive to the analog audio indication signal, for providing a variable audio warning depending on the rate of deceleration of the vehicle.

2. A braking system according to claim 1, wherein the visual brake warning means includes tail lights having a series of concentrically arranged rings r1, r2, r3 which radially light depending on the rate of deceleration.

3. A braking system according to claim 1, wherein the audio brake warning means includes a horn.

* * * * *